US012780643B2

(12) United States Patent
Park et al.

(10) Patent No.: US 12,780,643 B2
(45) Date of Patent: Nov. 3, 2026

(54) REFRIGERATOR

(71) Applicant: SAMSUNG ELECTRONICS CO., LTD., Suwon-si (KR)

(72) Inventors: Jungeun Park, Suwon-si (KR); Junho Shin, Suwon-si (KR); Choongeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 18/776,938

(22) Filed: Jul. 18, 2024

(65) Prior Publication Data

US 2025/0136427 A1 May 1, 2025

Related U.S. Application Data

(63) Continuation of application No. PCT/KR2024/010031, filed on Jul. 12, 2024.

(30) Foreign Application Priority Data

Oct. 30, 2023 (KR) ........................ 10-2023-0146254

(51) Int. Cl.
*B67D 1/12* (2006.01)
*B67D 1/00* (2006.01)
*F25D 23/12* (2006.01)

(52) U.S. Cl.
CPC ........... *B67D 1/124* (2013.01); *B67D 1/0014* (2013.01); *B67D 1/1238* (2013.01); *F25D 23/126* (2013.01)

(58) Field of Classification Search
CPC .... B67D 1/124; B67D 1/0014; B67D 1/1238; F25D 23/126
See application file for complete search history.

(56) References Cited

U.S. PATENT DOCUMENTS 9,567,201 B2 2/2017 Seo et al.
9,618,250 B2 4/2017 Park
(Continued)

FOREIGN PATENT DOCUMENTS

EP 1580502 A1 * 9/2005 .......... B01F 23/2361
KR 10-2005-0095339 9/2005
(Continued)

OTHER PUBLICATIONS

International Search Report issued on Oct. 25, 2024 in International Patent Application No. PCT/KR2024/010031 filed on Jul. 12, 2024.
(Continued)

*Primary Examiner* — Donnell A Long
(74) *Attorney, Agent, or Firm* — STAAS & HALSEY LLP

(57) ABSTRACT

A refrigerator including a water supply device in the door, and including a control valve to control the supply of water by the water supply device, a water supplier that is movable up and down, and an operation lever extending downward from the water supply device; and a controller configured to, when the water supplier is pressed, control the control valve in a first mode to supply water to the water container, and, in response to the operation lever being manually operated while the water supplier is not pressed, control the control valve in a second mode differently than in the first mode to supply water to the water container.

20 Claims, 13 Drawing Sheets

(56) References Cited

U.S. PATENT DOCUMENTS

| | | | | |
|---|---|---|---|---|
| 9,726,413 | B2 | 8/2017 | Seo et al. | |
| 10,551,100 | B2 | 2/2020 | Park et al. | |
| 10,794,628 | B2 | 10/2020 | Park et al. | |
| 11,215,394 | B2 | 1/2022 | Park et al. | |
| 11,821,680 | B2 | 11/2023 | Park et al. | |
| 2007/0204930 | A1* | 9/2007 | Phallen ................ | B67D 1/0888 222/394 |
| 2010/0293986 | A1 | 11/2010 | Jung | |
| 2012/0031136 | A1 | 2/2012 | Park | |
| 2021/0024342 | A1* | 1/2021 | Kim ..................... | B67D 1/0081 |
| 2024/0077249 | A1 | 3/2024 | Jeong et al. | |

FOREIGN PATENT DOCUMENTS

| | | |
|---|---|---|
| KR | 10-2009-0020951 | 2/2009 |
| KR | 10-1474013 | 12/2014 |
| KR | 10-2015-0121627 | 10/2015 |
| KR | 10-1584805 | 1/2016 |
| KR | 10-2016-0101656 | 8/2016 |
| KR | 10-1837451 | 3/2018 |
| KR | 10-2018-0080056 | 7/2018 |
| KR | 10-2020-0014706 | 2/2020 |
| KR | 10-2198958 | 1/2021 |
| KR | 10-2021-0156195 | 12/2021 |
| KR | 10-2343463 | 12/2021 |
| KR | 10-2022-0100445 | 7/2022 |
| KR | 10-2022-0122176 | 9/2022 |
| KR | 10-2471457 | 11/2022 |
| KR | 10-2023-0020740 | 2/2023 |
| KR | 10-2023-0022923 | 2/2023 |
| KR | 10-2497700 | 2/2023 |

OTHER PUBLICATIONS

Written Opinion issued on Oct. 25, 2024 in International Patent Application No. PCT/KR2024/010031 filed on Jul. 12, 2024.

* cited by examiner

REFRIGERATOR

CROSS-REFERENCE TO RELATED APPLICATIONS

This application is a continuation application, claiming priority under § 365 (c), of International application No. PCT/KR2024/010031, filed on Jul. 12, 2024, which is based on and claims the benefit of a Korean patent application number 10-2023-0146254, filed on Oct. 30, 2023, in the Korean Intellectual Property Office, the disclosures of which are incorporated by reference herein in its entirety.

BACKGROUND

1. Field

The disclosure relates to a refrigerator having a water supply device configured to supply water by manipulating an operation lever or mounting a water container.

2. Description of Related Art

As a home appliance, a refrigerator comprises a main body with a storage compartment and a cold air supply device configured to supply cold air to the storage compartment in order to keep the contents fresh.

The refrigerator may be provided with a dispenser configured to receive water from the outside of the refrigerator by manipulating an operation lever without opening the door.

The dispenser may discharge water with a press/push of the operation lever. If a large amount of water needs to be dispensed, the operation lever needs to be kept pressed/pushed until the water reaches a desired amount.

SUMMARY

Aspects of embodiments of the disclosure will be set forth in part in the description which follows and, in part, will be apparent from the description or may be learned by practice of the present embodiments.

Various embodiments of the disclosure provide a water supply device that supplies water using an operation lever or if a water container is mounted, water is supplied to the water container until it is filled with a predetermined amount of water.

According to an embodiment of the disclosure, a refrigerator includes a storage space; a door to open and close the storage space; a water supply device in the door, and including a control valve configured to control the supply of water by the water supply device, a water supplier configured to be movable up and down, and an operation lever extending downward from the water supplier, and a controller configured to, in response to the water supplier being pressed, control the control valve in a first mode to supply water to a water container, and, in response to the operation lever being manually operated while the water supplier is not pressed, control the control valve in a second mode differently than in the first mode to supply water to the water container.

According to an embodiment, the controller may be configured to control the control valve so that, in the first mode, a predetermined amount of water is supplied to the water container.

According to an embodiment, the controller may be configured to control the control valve so that, in the second mode, water is supplied to the water container only while the operation lever is manually operated.

According to an embodiment, the refrigerator may further include a water container mounting space below the water supply device, and a water container is removably positionable in the water container mounting space.

According to an embodiment, the water container may be configured to press the water supplier upward when the water container is positioned in the water container mounting space.

According to an embodiment, the refrigerator may further include a water level sensor to detect a water level of the water in the water container.

According to an embodiment, the controller may be configured to, in the first mode, and according to the water level detected by the water level sensor, control the control valve so that water is supplied to the water container until the detected water level in the water container reaches a preset water level.

According to an embodiment, the water container may include a water container body to store water, and a water container cover coupled to an upper portion of the water container body. The water container cover may include an inlet through which water flows into the water container body.

According to an embodiment, while the water container is positioned in the water container mounting space in a state in which the opening/closing portion is open.

According to an embodiment, the refrigerator may further include a seating recess configured to support a bottom surface of the water container while the water container is positioned in the water container mounting space.

According to an embodiment, the refrigerator may further include an anti-slip member on the seating recess and configured to prevent the water container supported on the seating recess from slipping on the seating recess.

According to an embodiment, the refrigerator may further include a water container sensor configured to detect upward movement of the water supplier and transmit a signal indicating the detected upward movement of the water supplier to the controller.

According to an embodiment, the water container sensor may include at least one of a magnetic sensor, an infrared sensor, or a capacitive sensor.

According to an embodiment, the refrigerator may further include an operation lever sensor configured to detect manual operation of the operation lever and transmit a signal indicating the detected manual operation of the operation lever to the controller.

According to an embodiment, the operation lever sensor must include at least one of a pressure sensor, a capacitive sensor, an infrared sensor, an optical fiber sensor, or a magnetic sensor.

According to an embodiment of the disclosure, a refrigerator includes a storage space; a door to open and close the storage space; a water supply device in the door to provide a supply of water, and including a control valve configured to control the supply of water by the water supply device, a water supplier configured to be movable up and down, and an operation lever extending downward from the water supplier, and that is manually operable; and a controller configured to, in response to the water supplier being pressed upward by a water container under the water supplier without the lever being manually operated, control the control valve in a first mode to supply water to the water container under the water supplier and pressing the water supplier upward, and, in response to the operation lever being manually operated while the water supplier is not pressed upward by a water container under the water supplier, control the control valve in a second mode differently than in the first mode to supply water to the water container under the water supplier and not pressing the water supplier upward.

According to an embodiment, the controller may be configured to control the control valve so that, in the first mode, a predetermined amount of water is supplied to the water container under the water supplier and pressing the water supplier upward.

According to an embodiment, the controller may be configured to control the control valve so that, in the second mode, water is supplied to the water container under the water supplier and not pressing the water supplier upward only while the operation lever is manually operated.

According to an embodiment, the refrigerator may further include a water container mounting space below the water supply device. The water container mounting space may be configured so that a water container is removably positionable in the water container mounting space to receive water supplied by the water supply device.

According to an embodiment, the refrigerator may further include the water container. The water container may be configured to press the water supplier upward when the water container is positioned in the water container mounting space.

According to various embodiments, a refrigerator is provided with a water supply device that selectively performs (e.g., executes) an auto-fill mode in which a predetermined amount of water is automatically supplied to a water container and a normal dispenser mode in which water is supplied by pressing (e.g., pushing) an operation lever, thereby more efficiently utilizing a limited inner space of the refrigerator.

Effects achievable in example embodiments of the disclosure are not limited to the above-mentioned effects, but other effects not mentioned may be apparently derived and understood by one of ordinary skill in the art to which example embodiments of the disclosure pertain, from the following description. In other words, unintended effects in practicing embodiments of the disclosure may also be derived by one of ordinary skill in the art from example embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 1:
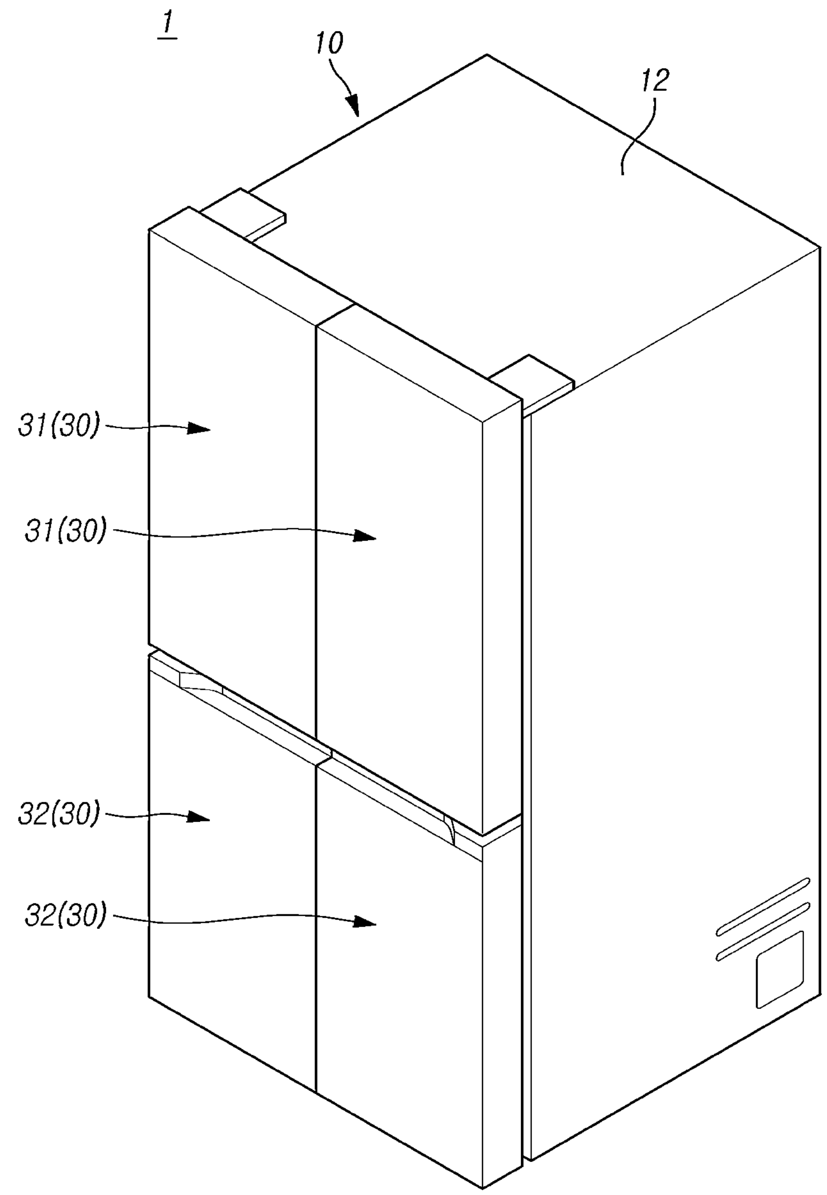
FIG. 1 is a perspective view illustrating an example refrigerator according to one or more embodiments.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Hereinafter, embodiments of the disclosure are described in detail with reference to the accompanying drawings. In the following description, specific details, such as detailed configurations and components, will be provided merely for a better understanding of embodiments of the disclosure. The same or similar reference denotations may be used to refer to the same or similar elements throughout the specification and the drawings. Further, for clarity and brevity, no description is made of well-known functions and configurations in the drawings and relevant descriptions.

Various embodiments of the disclosure are merely exemplified herein with reference to FIGS. 1 to 10, to describe the principle of the disclosure, and should not be interpreted as limiting the scope of the disclosure. Those skilled in the art will understand that the principle of the disclosure may be implemented in any appropriately disposed system or device.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

The term "and/or" may denote a combination(s) of a plurality of related components as listed or any of the components.

As used herein, such terms as "1st" and "2nd," or "first" and "second" may be used to simply distinguish a corresponding component from another and does not limit the components in other aspect (e.g., importance or order).

As used herein, the terms 'front side,' 'rear side,' 'upper side,' 'side surface,' 'left side,' 'right side,' 'upper portion,' and 'lower portion' are defined with respect to the drawings, and the shape and position of each component are not limited by the terms.

It will be further understood that the terms "comprise" and/or "have," as used herein, specify the presence of stated features, integers, steps, operations, elements, and/or components, but do not preclude the presence or addition of one or more other features, integers, steps, operations, elements, components, and/or groups thereof.

It will be understood that when a component is referred to as "connected to," "coupled to", "supported on," or "contacting" another component, the components may be connected to, coupled to, supported on, or contact each other directly or via a third component.

Throughout the specification, when one component is positioned "on" another component, the first component may be positioned directly on the second component, or other component(s) may be positioned between the first and second component.

The refrigerator according to an embodiment may include a main body.

The "main body" may include an inner case, an outer case disposed outside the inner case, and an insulator provided between the inner case and the outer case.

The "inner case" may include at least one of a case, a plate, a panel, or a liner forming a storage compartment. The inner case may be formed as a single body or may be formed by assembling a plurality of plates. The "outer case" may form the outer appearance of the main body and may be coupled to an outer side of the inner case so that the insulator is disposed between the inner case and the outer case.

The "insulator" may insulate the inside of the storage compartment and the outside of the storage compartment so that the temperature inside the storage compartment is maintained at a set appropriate temperature without being affected by the environment outside the storage compartment. According to an embodiment, the insulator may include a foam insulator. The foam insulator may be formed by injecting and foaming a urethane foam formed by mixing polyurethane and a foaming agent between the inner case and the outer case.

According to an embodiment, the insulator may further include a vacuum insulator in addition to the foam insulator, or the insulator may be composed of only a vacuum insulator instead of the foam insulator. The vacuum insulator may include a core material and an outer cover material that receives the core material and seals the inside at a pressure close to vacuum or vacuum. However, the insulator is not limited to the foam insulator or the vacuum insulator, and may include various materials that may be used for insulation.

The "storage compartment" may include a space (e.g., volume) limited by (e.g., smaller than that of) the inner case. The storage compartment may further include an inner case that limits a space corresponding to the storage compartment. Various items such as food, medicine, cosmetics, etc. may be stored in the storage compartment, and the storage compartment may be formed so that at least one side thereof is opened to take in and out the items.

The refrigerator may include one or more storage compartments. If two or more storage compartments are formed in the refrigerator, each storage compartment may have a different use and may be maintained at a different temperature. To that end, each storage compartment may be partitioned from each other by a partition wall including an insulator.

The storage compartment may be provided to be maintained in an appropriate temperature range according to the use, and may include a "refrigerating compartment", a "freezing compartment", or an "adjustable-temperature compartment" divided by the use and/or temperature range thereof. The refrigerating compartment may be maintained at a temperature suitable for refrigerating and storing items, and the freezing compartment may be maintained at a temperature suitable for freezing and storing items. The term "refrigerating" may mean cooling the item to the extent that the item is not frozen, and for example, the refrigerating compartment may be maintained in the range of 0 degrees Celsius to 7 degrees Celsius. The term "freezing" may mean cooling the item to freeze or remain frozen, and for example, the freezing compartment may be maintained in the range of minus 20 degrees Celsius to minus 1 degree Celsius. The adjustable-temperature compartment may be used as any one of the refrigerating compartment or the freezing compartment regardless of the user's selection or without it.

The storage compartment may be referred to as a "vegetable compartment", a "fresh compartment", a "cooling compartment", an "ice-making compartment", and the like, in addition to the names "refrigerating compartment", "freezing compartment", and "adjustable-temperature compartment", and the terms "refrigerating compartment", "freezing compartment", and "adjustable-temperature compartment" used below should be understood to collectively mean storage compartments having their respective corresponding uses and temperature ranges.

According to an embodiment, the refrigerator may include at least one door configured to open and close one open side of the storage compartment. The door may be provided to open and close each of one or more storage compartments, or one door may be provided to open and close a plurality of storage compartments. The door may be rotatably or slidably installed on the front surface of the main body.

The "door" may be configured to seal the storage compartment when the door is closed. Like the main body, the door may include an insulator to insulate the storage compartment when the door is closed.

According to an embodiment, the door may include a door outer plate forming a front surface of the door, a door inner plate forming a rear side (e.g., surface) of the door and facing the storage compartment, an upper cap, a lower cap, and a door insulator provided thereinside.

A gasket may be provided on the edge of the door inner plate to seal the storage compartment by being in close contact with the front surface of the main body when the door is closed. The door inner plate may include a dyke protruding rearward to mount a door basket capable of storing an object.

According to an embodiment, the door may include a door body and a front panel detachably coupled to a front side of the door body and forming a front surface of the door. The door body may include a door outer plate forming a front surface of the door body, a door inner plate forming a rear side (e.g., surface) of the door body and facing the storage compartment, an upper cap, a lower cap, and a door insulator provided thereinside.

The refrigerator may be classified into a French door type, a side-by-side type, a bottom mounted freezer (BMF), a top mounted freezer (TMF), multi-door type, or a one-door refrigerator according to the arrangement of the door and the storage compartment.

According to an embodiment, the refrigerator may include a cold air supply device configured to supply cold air to the storage compartment.

The "cold air supply device" may include a machine, an instrument, an electronic device, and/or a system combining the machine, the instrument, and the electronic device capable of generating cold air and providing the cold air to cool the storage compartment.

According to an embodiment, the cold air supply device may generate cold air through a refrigerating cycle including processes of compressing, condensing, expanding, and evaporating the refrigerant. To that end, the cold air supply device may include a refrigerating cycle device having a compressor, a condenser, an expansion device, and an evaporator capable of driving the refrigerating cycle. According to an embodiment, the cold air supply device may include a semiconductor such as a thermoelectric element. The thermoelectric element may cool the storage compartment by heating and cooling through the Peltier effect.

According to an embodiment, the refrigerator may include a machine room in which at least some components belonging to the cold air supply device are arranged (e.g., provided).

The "machine room" may be provided to be partitioned and insulated from the storage compartment to prevent heat generated from components disposed in the machine room from being transferred to the storage compartment. The inside of the machine room may be configured to communicate with the outside of the main body to dissipate heat from components disposed inside the machine room.

According to an embodiment, the refrigerator may include a dispenser provided on or in the door to provide water and/or ice. The dispenser may be provided on or in the door to be accessed by the user without opening the door.

According to an embodiment, the refrigerator may include an ice maker provided to produce ice. The ice maker may include an ice making tray for storing water, an ice maker for separating ice from the ice making tray, and an ice bucket for storing ice produced in the ice making tray.

According to an embodiment, the refrigerator may include a controller for controlling the refrigerator.

The "controller" may include a memory storing or recording a program and/or data for controlling the refrigerator, and a processor outputting a control signal for controlling the cold air supply device according to the program and/or data stored in the memory.

The memory stores or records various information, data, instructions, programs, etc., necessary for the operation of the refrigerator. The memory may store temporary data generated while generating a control signal for controlling components included in the refrigerator. The memory may include at least one of a volatile memory and a non-volatile memory or a combination thereof.

The processor controls the overall operation of the refrigerator. The processor may control the components of the refrigerator by executing a program stored in the memory. The processor may include a separate neural processing unit that performs the operation of the artificial intelligence model. The processor may include a central processing unit, a graphics processing unit, and the like. The processor may generate a control signal for controlling the operation of the cold supply device. For example, the processor may receive temperature information about the storage compartment from the temperature sensor and generate a cooling control signal for controlling the operation of the cold air supply device based on the temperature information about the storage compartment.

Further, the processor may process the user input of the user interface according to the program and/or data stored/stored in the memory and control the operation of the user interface. The user interface may be provided using an input interface and an output interface. The processor may receive a user input from the user interface. Further, the processor may transmit a display control signal and image data for displaying an image on the user interface to the user interface in response to the user input.

The processor and the memory may be provided integrally or separately. The processor may include one or more processors. For example, the processor may include a main processor and at least one sub-processor. The memory may include one or more memories.

The refrigerator may include a processor and a memory controlling all components included in the refrigerator, and a plurality of processors and a plurality of memories individually controlling the components of the refrigerator. For example, the refrigerator may include a processor and a memory controlling the operation of the cold air supply device according to the output of the temperature sensor. Further, the refrigerator may include a separate processor and a separate memory controlling the operation of the user interface according to a user input.

The communication module may communicate with an external device such as a server, a mobile device, another home appliance, or the like through an access point (AP). The AP may connect the local area network (LAN) to which the refrigerator or the user equipment is connected to the wide area network (WAN) to which the server is connected. The refrigerator or the user device may be connected to the server through the wide area network (WAN).

The input interface may include a key, a touch screen, a microphone, and the like. The input interface may receive a user input and transmit the user input to the processor.

The output interface may include a display, a speaker, and the like. The output interface may output various notifications, messages, information, and the like generated by the processor.

Figure 2:
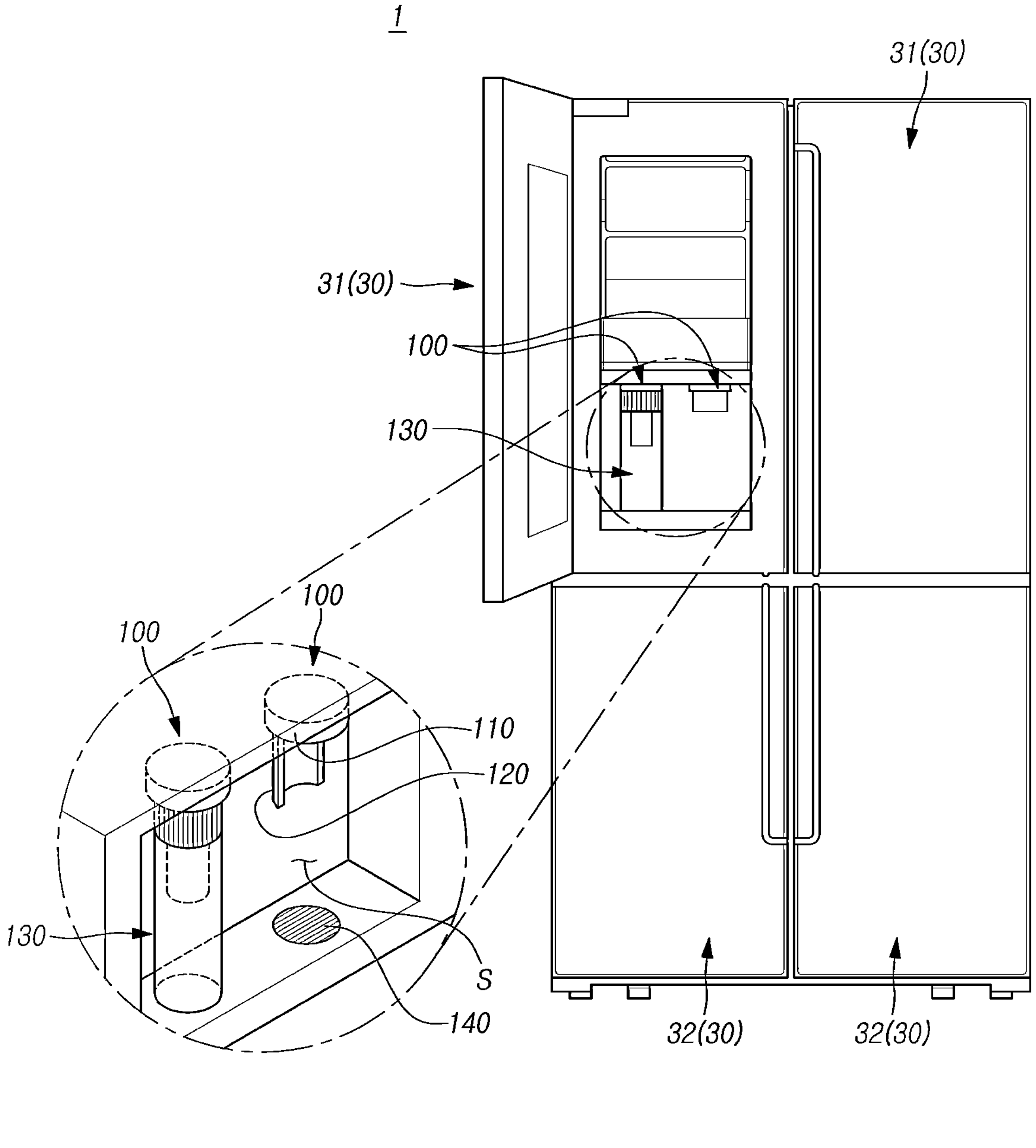
FIG. 2 is a front view illustrating an example refrigerator in a state in which a an outer door of a door-in-door is open according to one or more embodiments.
Figure 3:
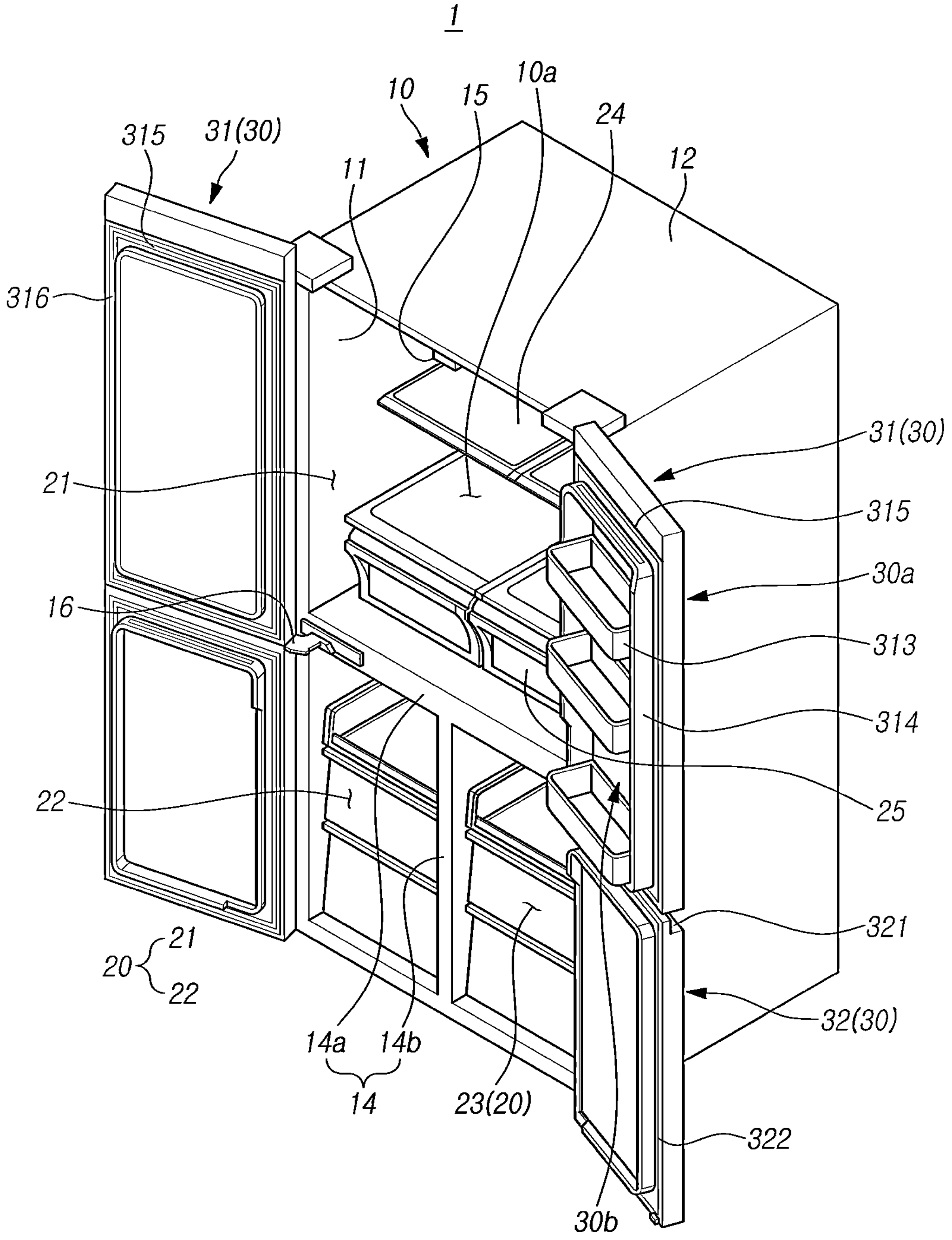
FIG. 3 is a perspective view illustrating an example refrigerator in a state in which all doors are open according to one or more embodiments.

FIG. 1 is a perspective view illustrating an example refrigerator according to one or more embodiments. FIG. 2 is a front view illustrating an example refrigerator in a state in which an outer door of a door-in-door is open according to one or more embodiments. FIG. 3 is a perspective view illustrating an example refrigerator in a state in which all doors are open according to one or more embodiments.

Referring to FIG. 1, a refrigerator 1 may include a main body 10, a storage compartment 20, a door 30, or a cold air generating unit (not shown).

The storage compartment 20 may be partitioned (e.g., divided) into several spaces inside the main body 10. The door 30 may be disposed, e.g., on the front side (e.g., surface) of the main body 10 to open and close the storage compartment 20. The cold air generating unit may be provided inside the main body 10 to supply cold air to, e.g., the storage compartment 20.

According to an embodiment, the main body 10 may include an inner housing 11 or an outer housing 12. The inner housing 11, e.g., may be provided to form an exterior of the storage compartment 20. The inner housing 11 may be integrally injection-molded with, e.g., a plastic material. The outer housing 12, e.g., may be provided to form at least a portion of the exterior of the refrigerator 1. The outer housing 12 may be formed of, e.g., a metal material having excellent durability and aesthetics. A receiving space may be formed between the outer housing 12 and the inner housing 11. A main body insulator (not shown) for insulating the storage compartment 20 may be disposed in a portion (e.g., section) of the receiving space.

According to an embodiment, the cold air generating unit may generate cold air using a cooling circulation cycle for compressing, condensing, expanding, and evaporating the refrigerant.

According to an embodiment, the storage compartment 20 may be partitioned (e.g., divided) into a plurality of compartments by a partition wall 14. In other words, the storage compartment 20 may be formed with respect to the inner housing 12 and the partition wall 14 of the main body 10. A plurality of shelves 24 or storage containers 25 may be disposed inside the storage compartment 20. The plurality of shelves 24 and the storage container 25 may be, e.g., removable.

According to an embodiment, the storage compartment 20 may be divided into a plurality of storage compartments (21, 22, and 23) by the partition wall 14. For example, as illustrated, the storage compartment 20 may include one first storage compartment 21 (e.g., an upper storage compartment) positioned at an upper portion, and two second storage compartments 22 (e.g., a lower storage compartment) and a third storage compartment 23 (e.g., a lower storage compartment) positioned at a lower portion.

According to an embodiment, the partition wall 14 may include a first partition wall 14*a* and a second partition wall 14*b*. The partition wall 14 may have, e.g., a T-shaped cross section. The first partition wall 14*a* may be disposed horizontally to divide, e.g., the first storage compartment 21 and the second and third storage compartments (22 and 23). The second partition wall 14*b* may be disposed vertically to divide, e.g., the second storage compartment 22 and the third storage compartment 23. The second partition wall 14*b* may be formed to extend downward from, e.g., the first partition wall 14*a*. The illustrated second partition wall 14*b* is formed to extend from the center of the first partition wall 14*a*, but the disclosure is not limited thereto, and the sizes of the second storage compartment 22 and the third storage compartment 23 may vary depending on the position of the second partition wall 14*b*.

The first storage compartment 21 of the illustrated storage compartment 20 may be used as a refrigerating chamber, and the second and third storage compartments (22 and 23) may be used as freezing chambers, but the disclosure is not limited thereto, and the position and number of each of the refrigerating chamber and the freezing chamber may vary depending on the user's needs.

Further, the number, size, or shape of the storage compartment 20 may vary depending on the shape or position of the partition wall 14. The freezing chamber may be maintained at about minus 20 degrees Celsius, and the refrigerating chamber may be maintained at about three (3) degrees Celsius. The storage compartment 20 may be insulated by, e.g., a partition wall 14.

According to an embodiment, the storage compartment 20 may be partitioned left and right by one vertical partition wall. In such an example embodiment, the vertical partition wall may be formed so that one end is in contact with the upper portion of the inner housing 11 and the other end is in contact with the lower portion of the inner housing 11. The size of the storage compartment 20 partitioned left and right may vary depending on the position of the vertical partition wall. For example, the storage compartment 20 having the vertical partition wall, disposed in the middle and partitioned left and right, may be disposed in mirror symmetry. According to an embodiment, there may be a plurality of vertical partition walls. If there are a plurality of vertical partition walls, three or more storage compartments 20 may be disposed in the left-right direction.

According to an embodiment, the storage compartment 20 may be partitioned only by one horizontal partition wall to provide an upper and lower sections. In other words, the storage compartment 20 may be partitioned into two (2), e.g., the upper storage compartment and the lower storage compartment. In such an example embodiment, the horizontal partition wall may be formed so that one end thereof is in contact with the left portion of the inner housing 11 and the other end thereof is in contact with the right portion of the inner housing 11. The size of the storage compartment 20 partitioned into an upper and lower sections (e.g., horizontally) may vary depending on the position of the horizontal partition wall. According to an embodiment, there may be a plurality of horizontal partition walls. If there are a plurality of horizontal partition walls, three (3) or more storage compartments 20 may be disposed in the up-down (e.g., vertical) direction.

In addition to the above-described embodiment, a plurality of storage compartments 20 of various types may be configured according to the shape and number of partition walls 14.

According to an embodiment, the door 30 may include a first door 31 (e.g., an upper door) or a second door 32 (e.g., a lower door) as illustrated. The door 30 may be disposed to open and close, e.g., the opening 10*a* of the main body 10. For example, a pair of first doors 31 (e.g., double door type) may be disposed to open and close the first storage compartment 21. A pair of second doors 32 (e.g., double door type) may be disposed to open or close, e.g., the second storage compartment 22 or the third storage compartment 23. Further, the number and shape of the doors 30 may vary depending on the number and shape of the storage compartment 20, and the door 30 may be configured in a sliding manner as well as a manner of rotating about the hinge 16.

According to an embodiment, a rotation bar 316 may be disposed on one of the pair of first doors 31. The rotation bar 316 may be disposed, e.g., on a side opposite to a side of one of the pair of first doors 31 forming a rotation shaft. The rotation bar 316 may be disposed such that, e.g., a rotation shaft is fixed to a side surface of one of the pair of first doors 31 to be rotatable about the rotation shaft. The rotation bar 316 may be disposed to be positioned in the middle of the front side (e.g., surface) of the main body 10 if one of the pair of first doors 31 is in a closed state. The rotation bar 316 may seal a gap between the pair of first doors 31 when the pair of first doors 31 are closed. The main body 10 may be disposed or equipped with a rotation bar guide 15 for guiding the movement of the rotation bar 316 when one of the pair of first doors 31 is closed.

According to an embodiment, the door 30 (e.g., the first door 31 or the second door 32) may include a door panel 30*a* or a door body 30*b*. The door panel 30*a* and the door body 30*b* may be detachably coupled to each other.

For example, one side of the door body 30*b* may be fixed to the main body 10 by the hinge 16. Accordingly, the door body 30*b* may be disposed to be rotatable about the main body 10. The door panel 30*a* may form, e.g., a portion of the front exterior of the refrigerator 1. The door panel 30*a* may provide aesthetics, especially if the refrigerator 1 is installed indoors (e.g., kitchen). Accordingly, the user may decorate the front side (e.g., surface) of the refrigerator 1 as desired by replacing it with a door panel 30*a* with a different color or design. According to an embodiment, the door panel 30*a* and the door body 30*b* may be integrally formed with each other.

Hereinafter, for convenience of description, only one (1) first door 31 and one (1) second door 32 are described, and a description of the remaining first door 31 and the remaining second door 32 is omitted. However, the first door 31 and the second door 32, which are not described, may be substantially the same as the first door 31 and the second door 32, which are described below, except that they are disposed to be symmetrical to each other. Further, the same configuration as that of the first door 31 may be applied to the second door 32, and a detailed description thereof may be omitted.

According to an embodiment, the first door 31 may include a first door handle (not shown), a first door shelf 313, a first shelf support 314, or a first gasket 315. The first door 31 may be rotatably coupled to the main body 10 to open and close at least a portion of the first storage compartment 21. The first door 31 may be opened or closed using the first door handle. The first door handle may be recessed in the bottom surface of the first door 31 or may protrude from the front side (e.g., surface) of the first door 31, but the disclosure is not limited thereto.

The first door shelf 313 may be disposed to receive, e.g., food. First shelf supports 314 may be disposed on both left and right sides of the first door shelf 313 to support the first door shelf 313. The first shelf support 314 may extend vertically from, e.g., the first door 31. In other words, the first shelf support 314 may be disposed to protrude backward from the rear side (e.g., surface) of the first door 31 and extend in the up-down direction. For example, the first shelf support 314 may be detachably disposed on the first door 31 as a separate component or may be integrally formed with the first door 31. The first shelf support 314 may be formed to protrude rearward from, e.g., the rear side (e.g., surface) of the door body 30*b*.

The first gasket 315 may be disposed to surround, e.g., a rear edge of the first door 31. Specifically, the first gasket 315 may be disposed to surround an edge of the door body 30*b*. The first gasket 315 may be provided to seal a gap with the main body 10 when the first door 31 is closed.

According to an embodiment, the second door 32 may include a second door handle 321 or a second gasket 322. The second door 32 may be rotatably coupled to the main body 10 to open and close the second storage compartment 22 or the third storage compartment 23. The user may open and close the second door 32 using the second door handle 321. The second door handle 321 may be recessed in the upper side (e.g., surface) of the second door 32 or may protrude from the front side (e.g., surface) of the second door 32, but the disclosure is not limited thereto.

The second gasket 322 may be disposed to surround, e.g., a rear edge of the second door 32. The second gasket 322 may be disposed to seal a gap with the main body 10 when the second door 32 is closed.

Although not illustrated, the second door 32 may further include all or some of the same components as the first door shelf 313 and the first shelf support 314 of the first door 31.

Figure 4:
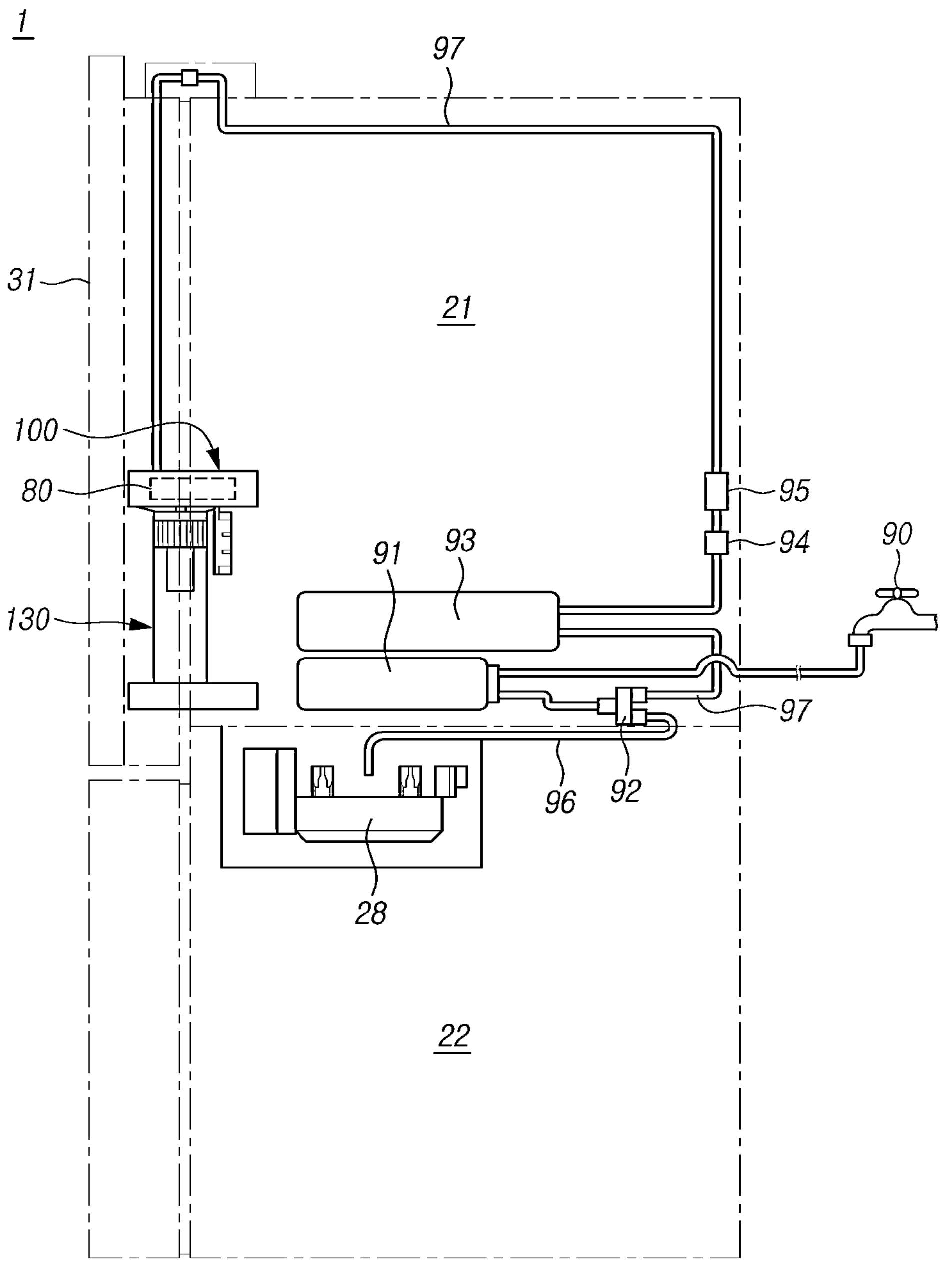
FIG. 4 is a schematic view illustrating an example water supply flow path of a refrigerator according to one or more embodiments.

FIG. 4 is a schematic view illustrating an example water supply flow path of a refrigerator according to one or more embodiments.

The refrigerator 1 illustrated in FIG. 4 may be substantially identical or similar to the refrigerator 1 illustrated in FIGS. 1 to 3. FIG. 4 is a view schematically illustrating a water supply structure of a refrigerator 1 provided to supply water through a water supply device, but the disclosure is not limited thereto.

Referring to FIG. 4, the refrigerator 1 may include a water purifying filter 91 and a water tank 93. The water purifying filter 91 may purify water supplied from an external water supply source 90. The water tank 93 may store purified water through the water purifying filter 91. The water tank 93 may be cooled by the cold air of the storage compartment 22.

An ice maker 28 for generating ice may be disposed in the storage compartment 22 of the refrigerator 1. The ice maker 28 may generate ice using the cold air of the storage compartment 22.

The refrigerator 1 may include a water supply flow conduit 97 forming a flow path (e.g., passage) connecting the external water supply source 90 and a control valve 80 to supply water to the automatic water supply device 100, and an ice maker flow conduit 96 connecting the external water supply source 90 and the ice maker 28 to supply water to the ice maker 28. The water supply device 100 may be disposed in a door (e.g., the second door 32) of the plurality of doors 30.

The ice maker flow conduit 96 and the water supply flow conduit 97 may be formed to separate at one point (e.g., separation point), and a flow path switching valve 92 may be disposed at the separation point to selectively supply water supplied from the external water supply source 90 to the control valve 80 or the ice maker 28. The water of the external water supply source 90 may be supplied to the control valve 80 or the ice maker 28 by the water pressure of the external water supply source 90 and the control of the flow path switching valve 92.

The water supply flow conduit 97 may be disposed to pass (e.g., flow) through the water purifying filter 91. Accordingly, the water of the external water supply source 90 may be purified through the water purifying filter 91 and supplied to the control valve 80. The water supply flow conduit 97 may be disposed to pass through the water tank 93. Accordingly, the water of the external water supply source 90 may be supplied to the control valve 80 after being cooled in the water tank 93.

A water valve 94 may be disposed in the water supply flow conduit 97. The water valve 94 may adjust the amount of water supplied from the water tank 93 to the control valve 80. A flow sensor 95 may be disposed in the water supply flow conduit 97 to measure the amount of water supplied to the control valve 80.

The ice maker flow conduit 96 may be disposed to pass through the water purifying filter 91. Accordingly, the water of the external water supply source 90 may be purified through the water purifying filter 91 and supplied to the ice maker 28. Since the water supplied to the ice maker 28 is cooled by the ice maker 28 even if it is not cooled in the water tank 93, the ice maker flow conduit 96 may not pass through the water tank 93.

Figure 5:
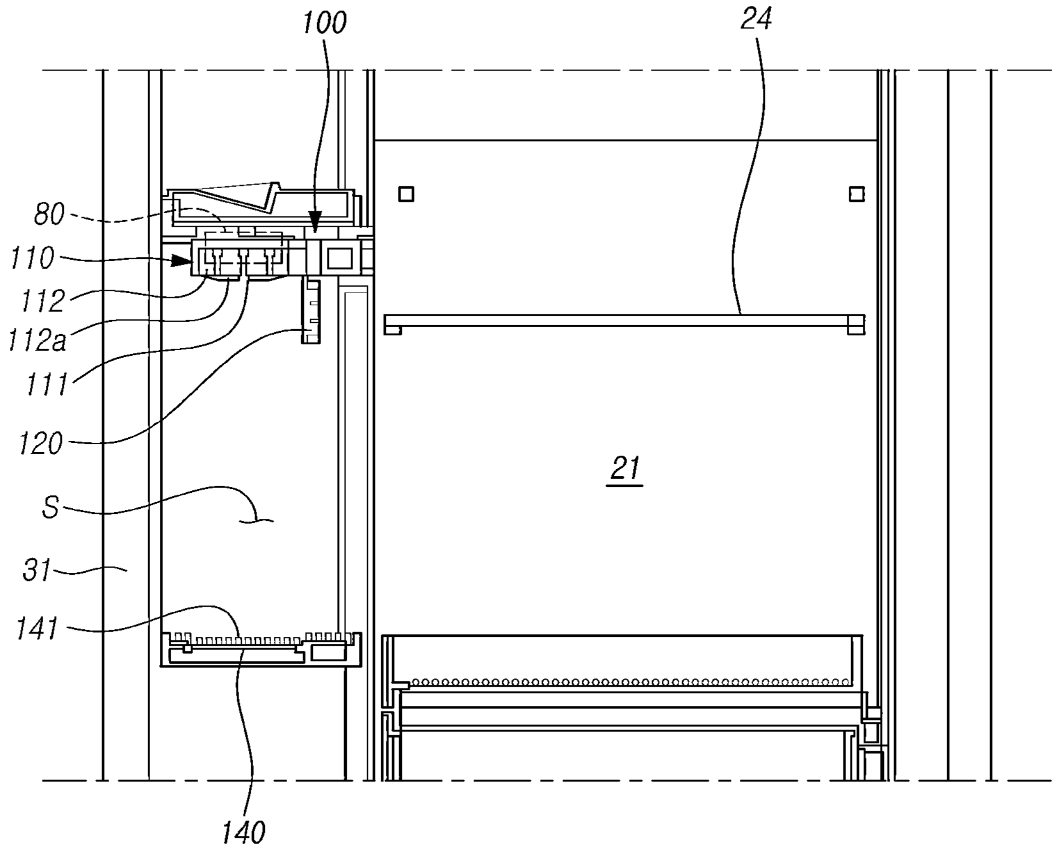
FIG. 5 is a cross-sectional view illustrating an example portion of a refrigerator according to one or more embodiments.

FIG. 5 is a cross-sectional view illustrating an example portion of a refrigerator according to one or more embodiments.

FIG. 5 illustrates a portion of the refrigerator 1 illustrated in FIGS. 1 to 4. Hereinafter, the same reference numerals are used for substantially the same components as those described with reference to FIGS. 1 to 4.

Referring to FIG. 5, the refrigerator 1 may include a water supply device 100. According to an example, the water supply device 100 may include a water supplier 110 and an operation lever 120. The water supplier 110 and the operation lever 120 may be integrally formed but are not limited thereto. The water supply device 100 may be referred to as, e.g., a dispenser.

The water supply device 100 may be modularized to be mounted and detached from the refrigerator 1. The modularized water supply device 100, configured to be mounted and detached in refrigerators 1, may be of various shapes or specifications without structural change.

According to an example, the water supplier 110 may include a control valve 80, an outlet 111, or a moving case 112. At least a portion of the control valve 80 may be received in, e.g., an inner space formed by the moving case 112. However, the disclosure is not limited thereto, and the control valve 80 may be included in the refrigerator 1 as a separate component from the water supplier 110.

According to an example, the outlet 111 may be formed in the lower surface 112*a* of the moving case 112. The outlet 111 may be an opening through which water supplied from an opened flow path (e.g., passage) is discharged through the control valve 80. The outlet 111 may be fluidly connected to, e.g., the water supply flow path (e.g., the water supply flow path 97 of FIG. 4).

According to an example, the moving case 112 may be configured to be movable up and down. The moving case 112 may be configured to be movable, e.g., by pressing. The moving case 112 may be positioned so that at least a portion thereof protrudes (e.g., extends) downward from the water supplier 110 when it is not pressed. The moving case 112 may be moved upward when pressed upward. For example, the moving case 112 may be moved upward when the water container 130, which is described below, is positioned in a water container mounting space S.

According to an example, the operation lever 120 may be coupled to the water supplier 110. The operation lever 120 may be connected (e.g., coupled) to be substantially perpendicular to the water supplier 110, but the disclosure is not limited thereto. The operation lever 120 may be disposed to protrude (e.g., extend) downward from the water supplier 110. The operation lever 120 may be configured to move or rotate relative to the water supplier 110 by external pressure. If the operation lever 120 is pressed or otherwise manually operated, the switch positioned on the rear side (e.g., surface) of the operation lever 120 may be turned on, and a signal indicating that the operation lever 120 is pressed may be transmitted to a controller (e.g., the controller 910 of FIG. 9). If the operation lever 120 is pressed, water may be supplied through the water supplier 110. The operation lever 120 may be pressed using e.g., a cup, and the controller 910 may receive the signal related to the operation lever 120 being pressed so as to instruct to supply water to the cup. However, the disclosure is not limited thereto, and the operation lever 120 may be configured so that the movement thereof is fixed, and a switch is disposed on one side of the operation lever 120 to detect whether the operation lever 120 is pressed.

Figure 6A:
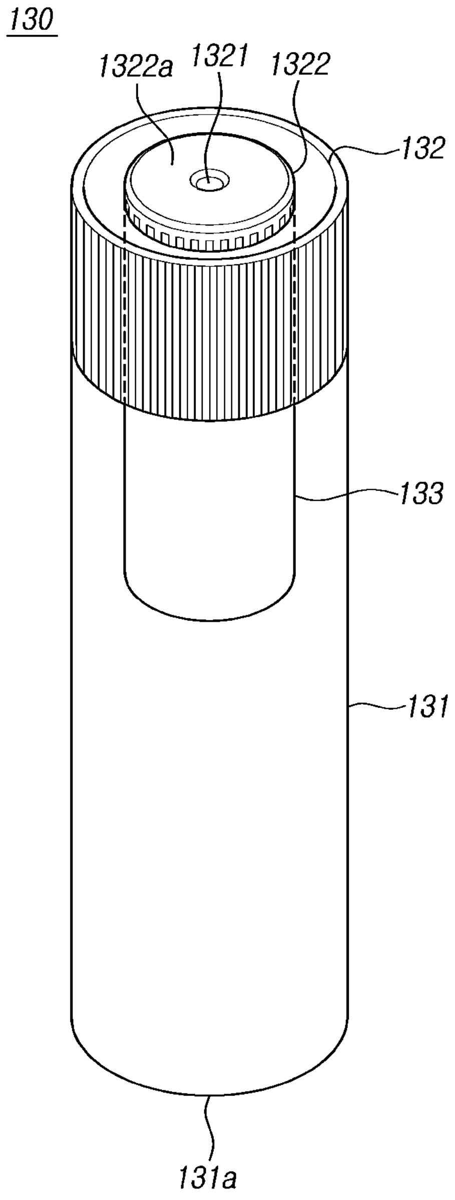
FIGS. 6A and 6B are perspective views illustrating an example water container of a refrigerator according to one or more embodiments.
Figure 6B:
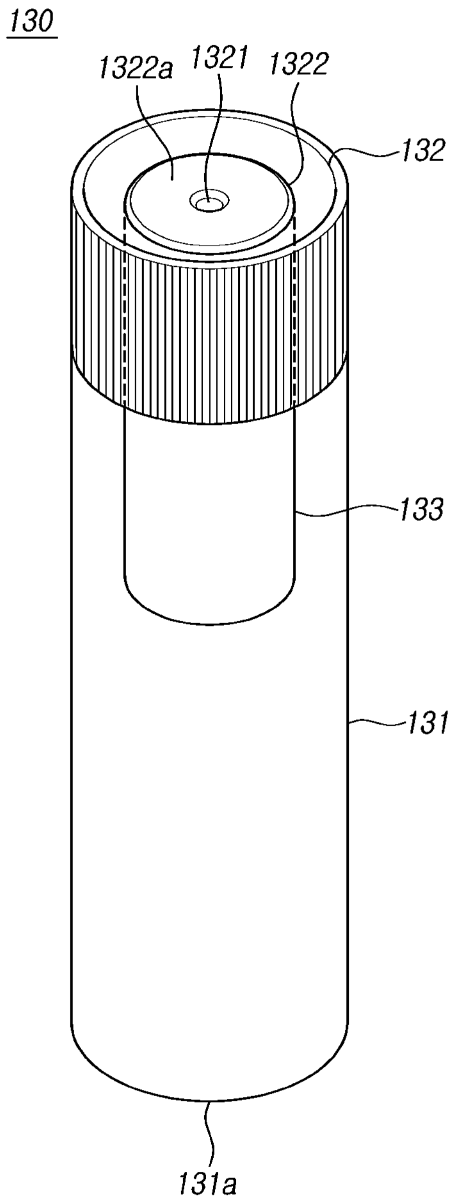

FIGS. 6A and 6B are perspective views illustrating an example water container of a refrigerator according to one or more embodiments.

The water container 130 illustrated in FIGS. 6A and 6B may be a component that is included in the refrigerator 1 illustrated in FIGS. 1 to 5 or may be used together with the water supply device 100 of the refrigerator 1.

Referring to FIGS. 6A and 6B, the water container 130 may include at least one of a water container body 131 for storing water, a water container cover 132 coupled to an upper portion of the water container body 131, or an infuser 133 capable of containing or accomodating, e.g., a tea bag.

The water container body 131 may store a predetermined amount of water. The maximum water storage amount that may be stored in the water container body 131 may be referred to as a full water storage amount. An upper portion of the water container body 131 may be open. The water container body 131 may be formed of a transparent material to allow observation of water stored therein, but the disclosure is not limited thereto. The water container body 131 may have a substantially cylindrical shape so as to provide better and easier grip, mount, and/or separation in a water container mounting space (e.g., the water container mounting space S of FIG. 5). However, the disclosure is not limited thereto, and the water container body 131 may have, e.g., a shape of a polygonal column. Although not shown, the water container body 131 may further include a handle portion protruding from the outer circumferential surface to provide better and easier grip of the water container body 131.

The water container cover 132 may be disposed to cover the open upper (e.g., top) portion of the water container body 131. The water container cover 132 may include an inlet 1321 to allow water to flow into the water container body 131. If the water container 130 is mounted in the water container mounting space (e.g., the water container mounting space S of FIG. 5), the inlet 1321 may be positioned to correspond to the outlet (e.g., the outlet 111 of FIG. 5) of the water supplier (e.g., the water supplier 110 of FIG. 5).

A sealing member (not shown) may be disposed between the water container body 131 and the water container cover 132 to prevent or reduce water leakage from the water container body 131. The sealing member may be formed of an elastic material such as rubber.

According to an example, the water container cover 132 may include an opening/closing portion 1322. The opening/closing portion 1322 may be configured to open and close the inlet through which water flows into the water container body 131 based on the position. For example, the opening/closing portion 1322 may be configured to move between a first position and a second position. If the opening/closing portion 1322 is positioned at the first position, the inlet through which water flows into the water container body 131 may be opened. If the opening/closing portion 1322 is positioned at the second position, the inlet through which water flows into the water container body 131 may be closed. The second position may be, e.g., lower than the first position. The opening/closing portion 1322 may be configured to be movable in the up-down direction (or a direction parallel to the length direction of the water container body 131). The upper surface 1322*a* of the opening/closing portion 1322 may be circular, but the disclosure is not limited thereto.

FIG. 6A illustrates a state in which the inlet of the water container 130 is open. FIG. 6A illustrates a state when the opening/closing portion 1322 is positioned at the first position. Hereinafter, a state when the opening/closing portion 1322 is positioned at the first position is referred to as an ‘open state.’

FIG. 6B illustrates a state in which the inlet of the water container 130 is closed. FIG. 6B illustrates a state when the opening/closing portion 1322 is positioned at the second position. Hereinafter, a state when the opening/closing portion 1322 is positioned at the second position is referred to as a ‘closed state’.

Figure 7A:
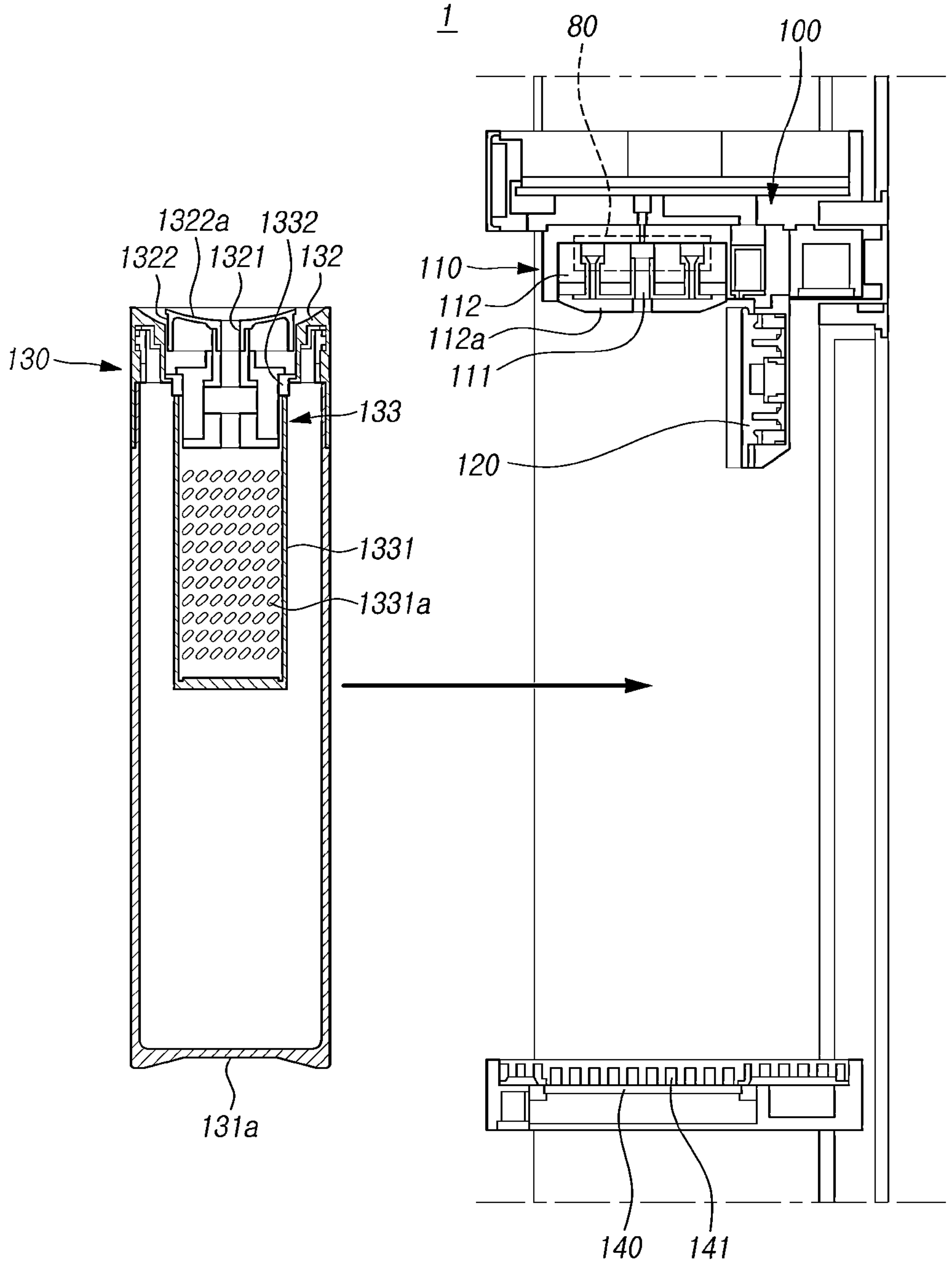
FIGS. 7A, 7B, and 7C are views illustrating an example process of operating a water supply device using a water container according to one or more embodiments.
Figure 7B:
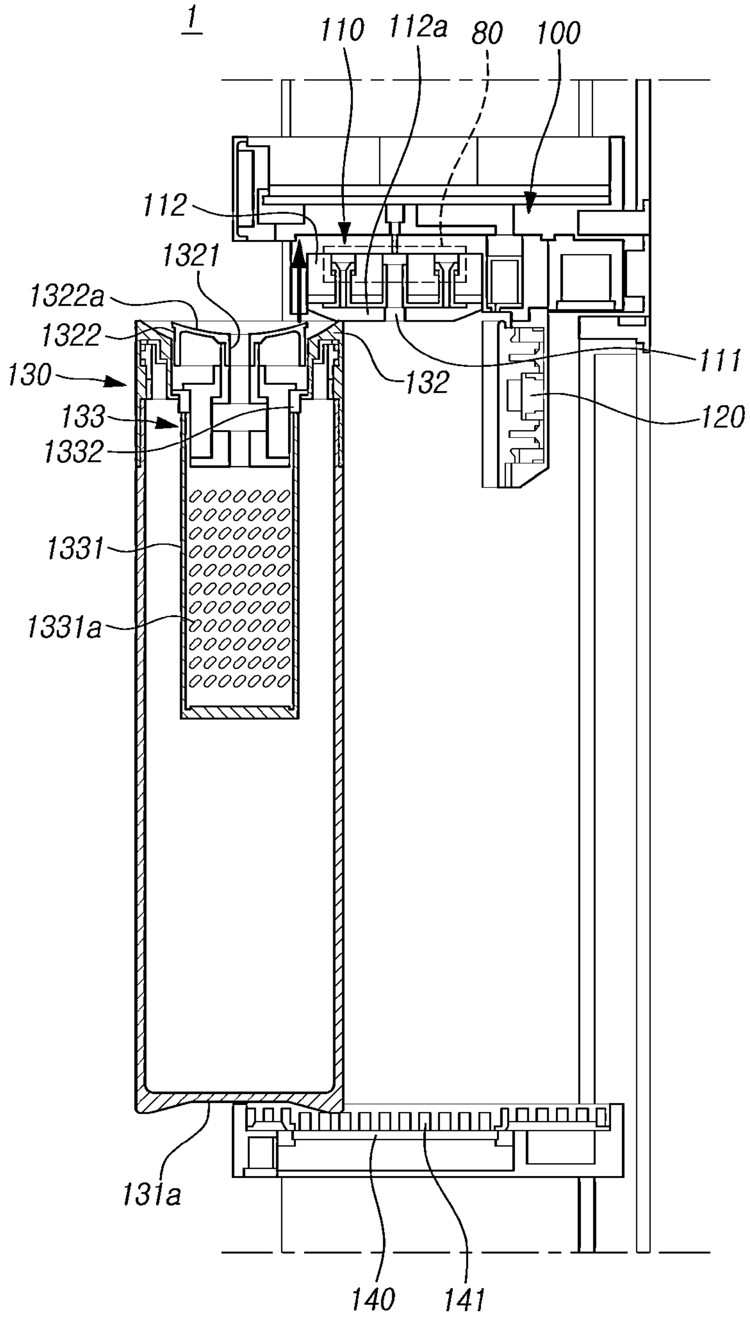
Figure 7C:
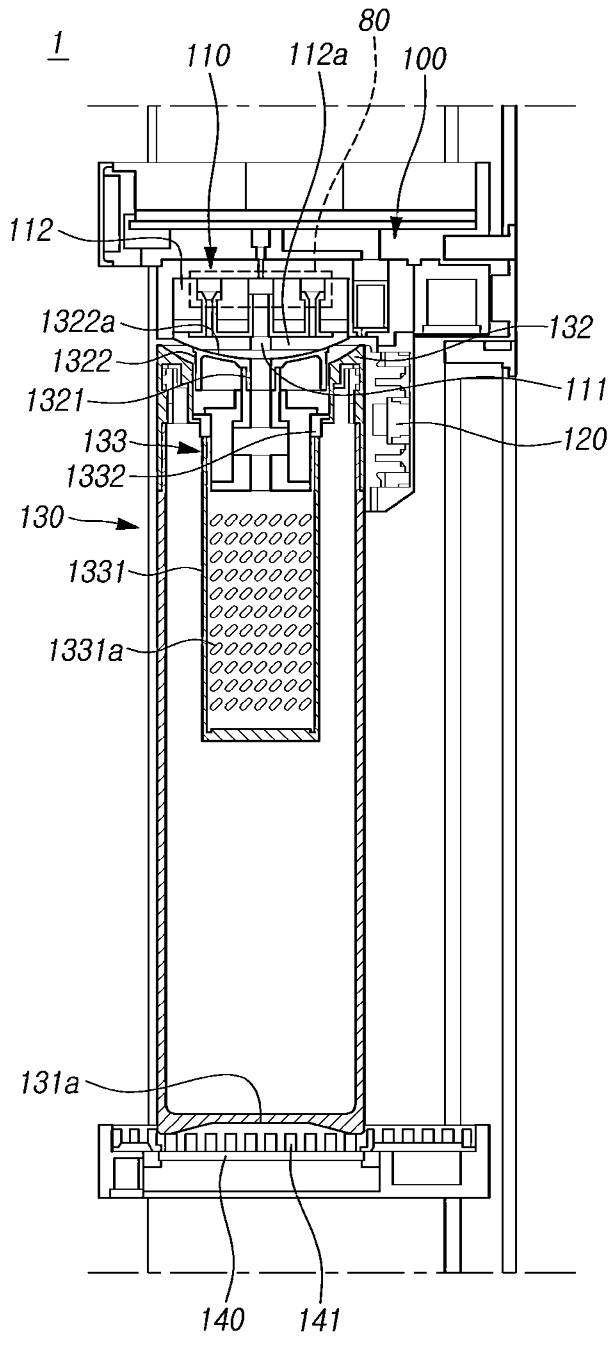

FIGS. 7A, 7B, and 7C are views illustrating an example process of operating a water supply device using a water container according to one or more embodiments.

The drawings illustrated in FIGS. 7A to 7C may be substantially identical or similar to the portion of the refrigerator 1 described with reference to FIGS. 1 to 5 and the water container 130 described with reference to FIGS. 6A and 6B. Hereinafter, the same reference numerals are used for components that are substantially identical or similar to those described with reference to FIGS. 1 to 6B.

According to an example, the infuser 133 may be received in the water container body 131. The infuser 133 may include a cylindrical portion 1331 and a wing portion 1332 (or an edge portion) extending horizontally outward from an upper end of the cylindrical portion 1331. The wing portion 1332 may be disposed on the upper part of the water container body 131. The cylindrical portion 1331 may include a plurality of through holes 1331*a*. The plurality of through holes 1331*a* may be provided to allow water to pass through the infuser 133. However, the disclosure is not limited thereto, and the configuration of the infuser 133 may be omitted from the water container 130.

Referring to FIG. 7A, the user may move the water container 130 to position the water container 130 below the water supply device 100. The water container 130 may be, e.g., moved in a substantially horizontal direction to be positioned below the water supply device 100 or may be mounted on the water supply device 100. If the water container 130 is introduced to the water container mounting space S, the water container 130 may be in the open state. For example, before the water container 130 is introduced to the water container mounting space S, the opening/closing portion 1322 of the water container 130 may be in a state in which the inlet 1321 is open.

The refrigerator 1 may include a water container mounting space S for positioning the water container 130 below the water supply device 100. For example, a seating recess 140 having a shape corresponding to the shape of the bottom surface 131*a* of the water container 130 (or the water container body 131) may be formed in the bottom side (e.g., surface) of the water container mounting space S. By seating the water container 130 in the seating recess 140, it is possible to prevent or minimize the water container 130 from escaping from the water container mounting space S while the water container 130 is positioned in the water container mounting space S.

According to an example, the refrigerator 1 may further include an anti-slip member 141 to prevent or keep the water container 130 from slipping on the seating recess 140. The anti-slip member 141 may be, e.g., a rubber material, but the disclosure is not limited thereto.

FIG. 7B illustrates an initial state in which the water container 130 enters the water container mounting space S. If the water container 130 enters the water container mounting space S, an upper portion of the water container 130 may press the moving case 112 of the water supplier 110. For example, if the water container 130 is introduced to the water container mounting space S, the moving case 112 may be pressed by the water container cover 132 or the opening/closing portion 1322 of the water container 130. The opening/closing portion 1322 is configured to open the inlet 1321 by moving upward, and the opening/closing portion 1322 moved upward may press the moving case 112. For this reason, the moving case 112 may be moved upward.

FIG. 7C illustrates a state in which the water container 130 is received or seated in the water container mounting space S. The water container 130 may be positioned on the seating recess 140. In a state in which the water container 130 is seated in the water container mounting space S, the moving case 112 may maintain a state of being moved upward by the water container 130. If the moving case 112 is moved upward, the controller 910 to be described below may be configured to detect the movement of the moving case 112. For example, if the moving case 112 is moved, the controller 910 may detect the state in which the water container 130 is mounted.

According to an example, the refrigerator 1 may include a water container sensor (e.g., the water container sensor 930 of FIG. 9) for detecting movement of the water supplier 110 or the moving case 112. The water container sensor 930 may include various types of sensors for detecting an upward movement of the moving case 112, e.g., at least one of a contact type sensor or a non-contact type sensor, a magnetic sensor, an infrared (IR) sensor, or a capacitive sensor.

According to an example, if the water container 130 is received or seated in the water container mounting space S in the closed state, the moving case 112 may not be moved upward or the movement is so small or below a certain threshold that the water container sensor 930 cannot detect the movement of the moving case 112. Therefore, in a closed state of the water container 130, even if the water container 130 is received or seated in the water container mounting space S, water may not be supplied to the water container 130. In the disclosure, water supply may be prevented while the water container 130 is closed, thereby preventing or reducing water leakage into the inner space of the refrigerator 1 rather than the water container 130.

According to an example, if the water container 130 is received in the water container mounting space S, the water container 130 may contact the operation lever 120 or may be fixed to press the operation lever 120. If the controller 910 determines that the water container 130 moves the moving case 112 upward and presses and moves the operation lever 120 to move it or contacts the operation lever 120, the controller 910 may supply water to the water container 130.

In the state of FIG. 7C, the refrigerator 1 (or the controller 910) may supply water to the water container 130 in a first mode. The refrigerator 1 (or the controller 910) may control the control valve 80 in the first mode in response to the water supplier 110 being pressed. In this case, a predetermined amount of water may be supplied to the water container 130. Here, the first mode may refer to a mode (e.g., the auto fill mode) in which the control valve 80 is controlled to automatically supply a predetermined amount of water without user intervention. Whether the predetermined amount of water is supplied to the water container 130 may be detected and determined using a water level sensor (e.g., the water level sensor 940 of FIG. 9). The water level sensor 940 may be mounted on, e.g., the water supplier 110 or the operation lever 120, but the disclosure is not limited thereto.

The first mode is not limited to the above-described automatic water supply operation and may be configured to perform another operation in response to the water supplier 110 being pressed. For example, the first mode may be a mode for supplying ice or carbonated water, although not shown. That is, the refrigerator 1 may be equipped with a dispenser configured to provide ice or carbonated water. In this case, the first mode may be set to the ice or carbonated water providing mode. If the first mode is the mode for supplying ice or carbonated water, the water container 130 may not be used, and the user may operate the first mode by directly pressing the water supplier 110 upward using a cup.

Figure 8:
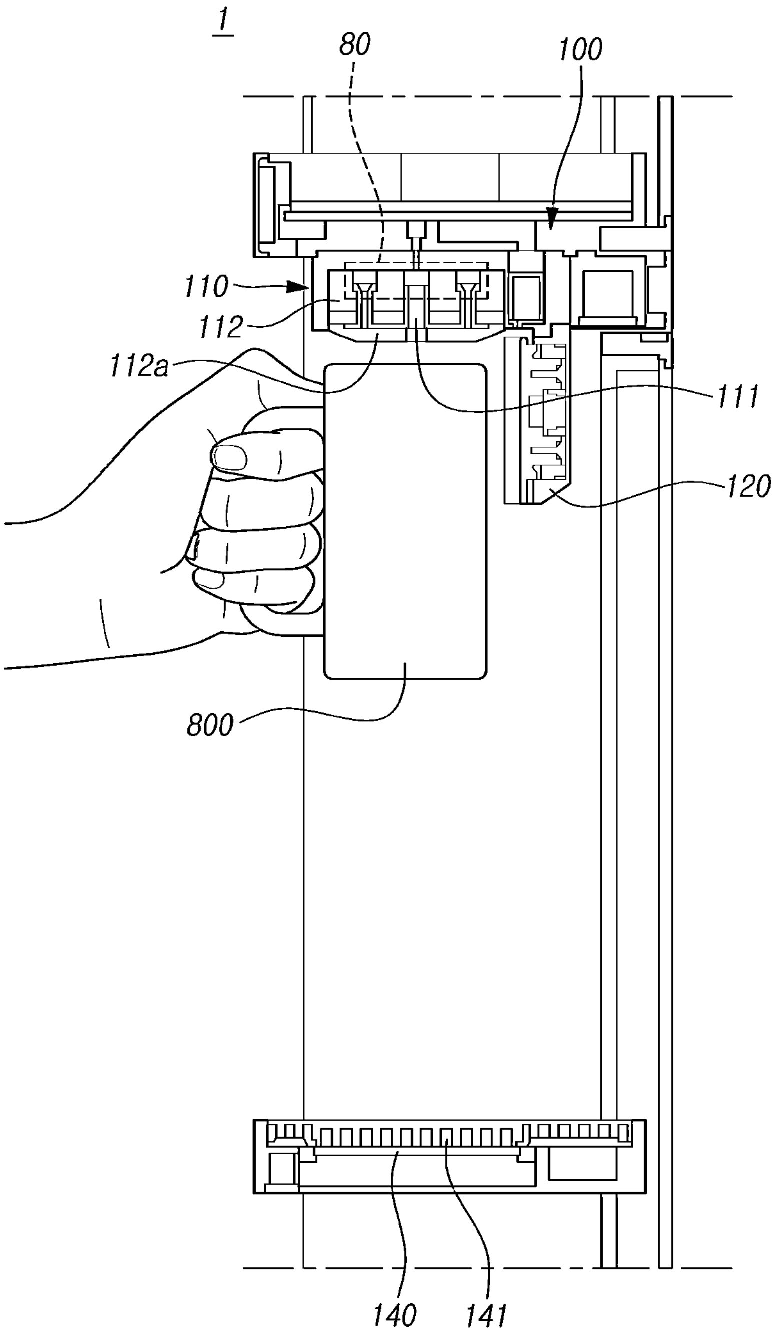
FIG. 8 illustrates an example process of operating a water supply device using an operation lever according to one or more embodiments.

FIG. 8 is a view illustrating an example process of operating a water supply device using an operation lever according to one or more embodiments.

FIG. 8 may be substantially identical or similar to a portion of the refrigerator 1 described with reference to FIGS. 1 to 5. Hereinafter, the same reference numerals are used for components that are substantially identical or similar to those described with reference to FIGS. 1 to 5.

Referring to FIG. 8, a process in which the user directly uses the water supply device 100 of the refrigerator 1 using the cup 800, not a water container (e.g., the water container

130 of FIG. 7A), is illustrated. If the user uses the cup 800, the user may receive water by pressing the operation lever 120. In this case, the moving case 112 may not be pressed upward.

If only the operation lever 120 is pressed, the refrigerator 1 (or the controller 910) may perform a second mode. The second mode may be a mode different from the first mode described with reference to FIGS. 7A to 7C. Here, the second mode may refer to a mode in which the refrigerator 1 (or the controller 910) controls the control valve 80 to supply water only while the operation lever 120 is pressed or touched. The second mode may refer to, e.g., the normal dispenser mode. If the control valve 80 is opened, water may be supplied through the outlet 111.

As described above, the disclosure may be configured to perform the autofill mode in which a predetermined amount of water fills the water container 130 or the normal dispenser mode in which water is supplied to a cup held by the user according to the needs of the user using one water supply device 100. Since two different water supply methods are provided even if only one water supply device 100 is disposed, the limited space inside the refrigerator 1 may be efficiently utilized. For example, if two or more water supply devices 100 are disposed in the refrigerator 1, the user may freely use the autofill mode using the water container 130 in some of the plurality of water supply devices 100 and the normal dispenser mode using a cup in others of the plurality of water supply devices 100 according to their convenience.

As described above, the refrigerator 1 may perform the first mode by the operation described with reference to FIGS. 7A to 7C or may perform the second mode by the operation described with reference to FIG. 8.

Figure 9:
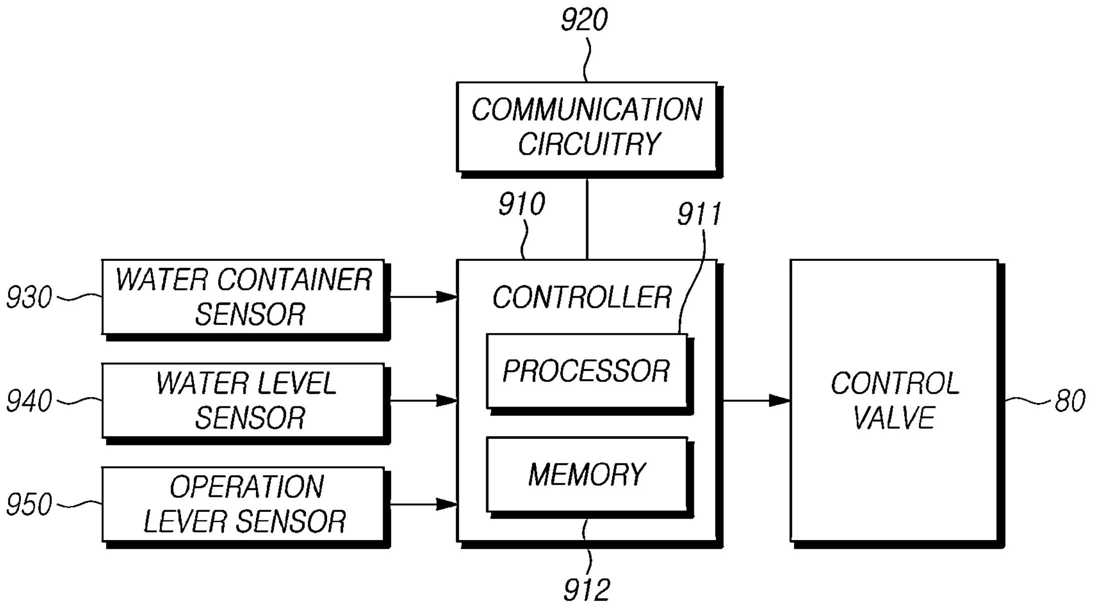
FIG. 9 is a control block view illustrating an example refrigerator according to one or more embodiments.

FIG. 9 is a control block view illustrating an example refrigerator according to one or more embodiments.

The control block diagram illustrated in FIG. 9 is exemplary, and the disclosure is not limited to the illustrated configuration. For example, the refrigerator 1 may further include various types of sensors other than the illustrated sensors. The refrigerator 1 illustrated in FIG. 9 may be substantially identical or similar to the refrigerator 1 illustrated in FIG. 1. The same reference numerals are applied to substantially the same or similar components among the above-described components.

Referring to FIG. 9, the refrigerator 1 may include at least one of a communication circuitry 920, a water container sensor 930, a water level sensor 940, an operation lever sensor 950, a controller 910, or a control valve 80. The controller 910 may control the control valve based on the signal received from the water container sensor 930, the water level sensor 940, or the operation lever sensor 950.

According to an example, the refrigerator 1 may include the communication circuitry 920 that supports signal transmission/reception to/from the outside. In an example, the communication circuitry 920 may receive and/or transmit a wired/wireless signal to/from an external wired/wireless communication system, an external server, and/or other devices according to a predetermined wired/wireless communication protocol. In an example, the communication circuitry 920 may include one or more modules to connect the refrigerator 1 to one or more networks. In an example, the communication circuitry 920 may include at least one of a mobile communication module, a wired/wireless Internet module, a short-range communication module, and/or a location information module.

In an example, the mobile communication module may transmit/receive wireless signals with at least one of an external base station, an external terminal, and an external server through the mobile communication network according to any communication protocol among various communication protocols for mobile communication. The wireless signals may include various types of data signals. In an example, the wireless signals may include voice call signals, video call signals, and text/multimedia message signals, but the disclosure is not limited thereto.

For example, the wired/wireless Internet module may support wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), or long term evolution-advanced (LTE-A), but is not limited thereto. In an example, the wired/wireless Internet module of the communication circuitry 920 may transmit/receive data according to at least one wired/wireless Internet technology among Internet technologies not listed above.

The short-range communication module may be intended for, e.g., short-range communication and may support short-range communication using at least one of Bluetooth, radio frequency identification (RFID), infrared data association (IrDA), ultra-wideband (UWB), ZigBee, near-field communication (NFC), Wi-Fi, Wi-Fi Direct, or wireless universal serial bus (USB) technology. The short-range communication module may support, e.g., wireless communication between the refrigerator 1 and a wireless communication system, between the refrigerator 1 and another device, or between the refrigerator 1 and a network in which the other device is positioned through a short-range wireless communication network.

The location information module may be, e.g., a global positioning system (GPS) module or a Wi-Fi module as a module for obtaining the location of the refrigerator 1. If the refrigerator 1 utilizes the GPS module, the refrigerator 1 may receive information about the location of the refrigerator 1 using the signal transmitted from the GPS satellite. If the refrigerator 1 utilizes the Wi-Fi module, the refrigerator 1 may receive information about the location of the refrigerator 1 based on information about a wireless AP that transmits and receives a wireless signal to and from the Wi-Fi module.

In an example, the communication circuitry 920 may receive the configuration data signal input by the user on the mobile terminal of the user in the form of a wireless signal according to a predetermined wireless communication protocol. In an example, the communication circuitry 920 may receive information and/or a command for controlling the operation of the refrigerator 1 from an external server in the form of a signal according to a predetermined wired/wireless communication protocol. The communication circuitry 920 may transmit various received signals to the controller 910 to be described below. In an example, the communication circuitry 920 may transmit various data generated or obtained on the refrigerator 1 in the form of a wired/wireless signal according to a predetermined wired/wireless communication protocol, e.g., to a mobile terminal of the user or an external server.

According to an example, the water container sensor 930 may include a sensor for detecting whether the water container 130 is mounted. The water container sensor 930 may be configured to transmit a signal for the upward movement of the water supplier 110 to the controller 910. The water container sensor 930 may include, but is not limited to, a contact-type or non-contact type sensor, a magnetic sensor, an IR sensor, or a capacitive sensor.

According to an example, the water level sensor 940 may include a sensor for detecting the water level of the water received in the mounted water container 130. The water level sensor 940 may be an ultrasonic sensor, but the disclosure is not limited thereto. For example, the water level sensor 940 may include, but is not limited to, a radar sensor, a microwave sensor, an IR sensor, or a lidar sensor.

According to an example, the operation lever sensor 950 may include a sensor that detects whether the operation lever 120 is pressed or touched. The operation lever sensor 950 may transmit a signal indicating whether the operation lever 120 is pressed or touched to the controller 910. The operation lever sensor 950 may include, but is not limited to, at least one of a pressure sensor, a capacitive sensor, an infrared sensor, an optical fiber sensor, or a magnetic sensor.

According to an example, the refrigerator 1 may include a controller 910 for controlling the overall operation of the refrigerator 1. The controller 910 may include a memory 912 for storing or recording a program and/or data for controlling each component of the refrigerator 1, and a processor 911 for generating a control signal for controlling each component of the refrigerator 1 according to the program and/or data stored in the memory 912 and information obtained from each of the other components.

According to an example, the memory 912 may store various data that may be used to control the operation of each component of the refrigerator 1. The memory 912 may store, e.g., a plurality of application programs used in the refrigerator 1, data for controlling the operation of the refrigerator 1, and instructions. At least some of the application programs stored in the memory 912 may be downloaded from an external server through wireless communication. At least some of the application programs stored in the memory 912 may be stored in the memory 912 from the time of shipment for the basic functions of the refrigerator 1.

In an example, the processor 911 of the controller 910 may receive power on/off signals, operation setting information (e.g., operation start/stop, operation mode selection, or operation internal temperature) of the refrigerator 1 or other various control information. For example, the processor 911 may obtain information about whether the water container 130 is mounted from the water container sensor 930. For example, the processor 911 may obtain information about whether the operation lever 120 is pressed or touched from the operation lever sensor 950. For example, the processor 911 may obtain information about the water level of the water received in the water container 130 from the water level sensor 940.

In an example, the processor 911 of the controller 910 may generate an operation control command for each component of the refrigerator 1, based on various information received from the outside (e.g., the communication circuitry 920, the water container sensor 930, the water level sensor 940, or the operation lever sensor 950). The processor 911 may adjust the operation of the cold air supply device to adjust the operation strength or suction strength of the refrigerator 1.

In an example, the processor 911 may continuously obtain information from the outside (e.g., the communication circuitry 920, the water container sensor 930, the water level sensor 940, or the operation lever sensor 950) while the operation of the refrigerator 1 is being performed (e.g., executed) and may continuously update and control the operation of each component (e.g., the water supply device 100 or the control valve 80) based on the obtained information.

In an example, the processor 911 may determine whether the water container 130 is disposed in the water container mounting space S using the water container sensor 930.

In an example, the processor 911 may determine whether the operation lever 120 is pressed or touched using the operation lever sensor 950.

In an example, the processor 911 may measure the height of the water received in the water container 130 using the water level sensor 940.

In an example, the processor 911 may control the opening and closing of the control valve 80 to adjust the supply of water.

In the drawings, the controller 910 is disclosed as a comprehensive component for controlling all the components included in the refrigerator 1, but the disclosure is not limited thereto. In an example, the refrigerator 1 may be configured to include a plurality of controller components that individually control some of the components of the refrigerator 1. The refrigerator 1 may include a separate controller including a processor and a memory for controlling an operation of a user interface according to a user input. The processor 911 of the controller 910 may include a plurality of processors, and the memory 912 may include a plurality of memory devices.

Figure 10:
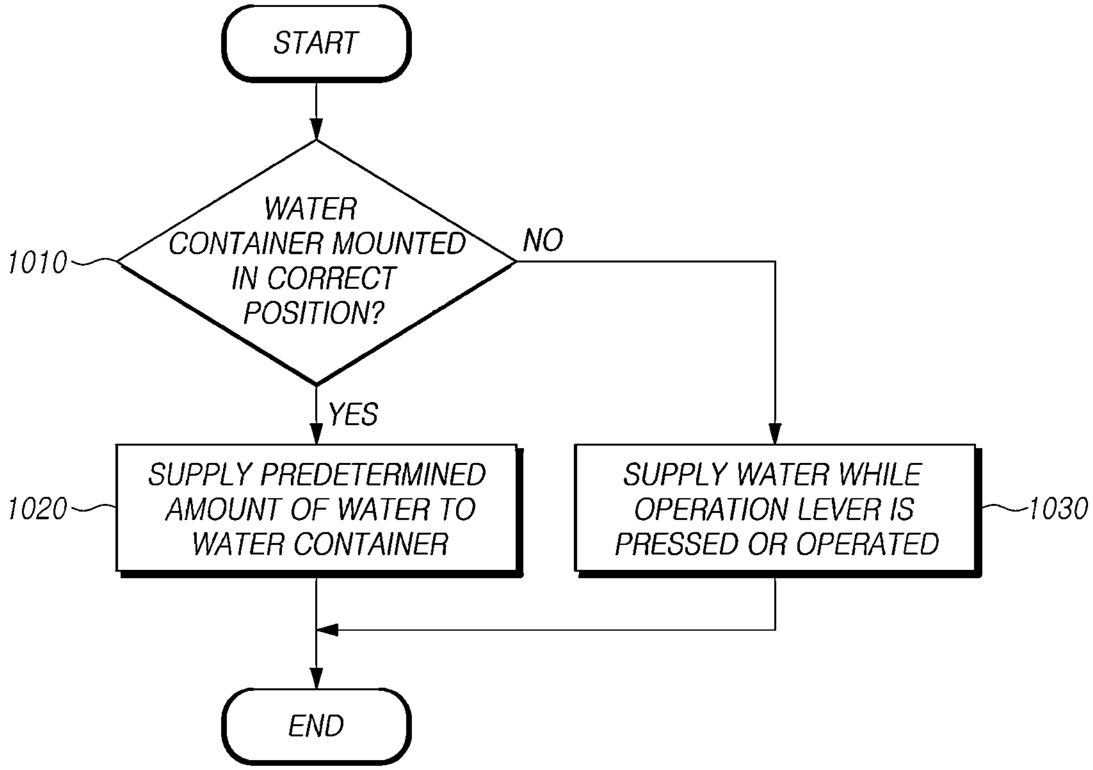
FIG. 10 is a flowchart illustrating an example method for controlling water supply of a refrigerator according to one or more embodiments.

FIG. 10 is a flowchart illustrating an example method for controlling water supply of a refrigerator according to one or more embodiments.

The flowchart of FIG. 10 is a flowchart illustrating a method for controlling the refrigerator 1 illustrated in FIGS. 1 to 9.

Referring to FIG. 10, the controller 910 may perform an operation 1010 of determining whether the water container 130 is mounted in a correct position. Here, the correct position may refer to a position where it is mounted in the water container mounting space S. The controller 910 may determine whether the water container 130 is mounted in the correct position using the water container sensor 930. For example, if the moving case 112 of the water supplier 110 is moved upward and fixed, the controller 910 may determine that the water container 130 is mounted in the correct position. Alternatively, e.g., if the moving case 112 of the water supplier 110 is moved upward and fixed, and the operation lever 120 is pressed or touched, the controller 910 may determine that the water container 130 is mounted in the correct position.

According to an example, if it is determined that the water container 130 is mounted in the correct position, the controller 910 may perform an operation 1020 of supplying a predetermined amount of water to the water tank 130. Operation 1020 may be referred to as an "autofill mode" or a "first mode" in which the water container 130 is filled with a predetermined amount of water, but the disclosure is not limited thereto. If the controller 910 determines that the water container 130 is mounted in the correct position, the controller 910 may perform control to automatically supply a predetermined amount of water to the water container 130. The controller 910 may supply water by opening the control valve 80. The controller 910 may detect the water level of the water filling the water container 130 using the water level sensor 940. The controller 910 may perform water supply until the water level of the water filling the water container 130 reaches a predetermined height. When it is determined that the water tank 130 is filled with a predetermined amount of water, or when it is determined that the water tank 130 is filled at a predetermined water level, the controller 910 may close the control valve 80 to terminate water supply.

According to an example, if it is determined that the water container 130 is not mounted in the correct position, the controller 910 may perform an operation 1030 of supplying water while the operation lever 120 is pressed or touched. Operation 1030 may be referred to as a "dispenser mode" or a "second mode" for supplying water to the cup 800 gripped by the user, but the disclosure is not limited thereto. The controller 910 may determine whether the operation lever 120 is pressed or touched using the operation lever sensor 950.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

In the disclosure, the above-described description has been made mainly of specific embodiments, but the disclosure is not limited to such specific embodiments but should rather be appreciated as covering all various modifications, equivalents, and/or substitutes of various embodiments.

What is claimed is:

1. A refrigerator, comprising:
a storage space;
a door to open and close the storage space;
a water supply device in the door, and including:
a control valve configured to control a supply of water by the water supply device,
a water supplier configured to be movable up and down, the water supplier having a lower surface configured to contact an upper surface of a removably positionable water container such that an external upward force by the water container moves the water supplier from a lower position to an upper position, and
an operation lever extending downward from the water supplier; and
a controller configured to:
in response to the water supplier being pressed upward by the water container, control the control valve in a first mode to supply water to a water container, and
in response to the operation lever being manually operated while the water supplier is not pressed, control the control valve in a second mode differently than in the first mode to supply water to the water container.

2. The refrigerator of claim 1, wherein
the controller is configured to control the control valve so that, in the first mode, a predetermined amount of water is supplied to the water container.

3. The refrigerator of claim 1, wherein
the controller is configured to control the control valve so that, in the second mode, water is supplied to the water container only while the operation lever is manually operated.

4. The refrigerator of claim 1, further comprising:
a water container mounting space below the water supply device; and
the water container which is removably positionable in the water container mounting space.

5. The refrigerator of claim 4,
wherein the water container is configured to press the water supplier upward when the water container is positioned in the water container mounting space.

6. The refrigerator of claim 4, further comprising:
a water level sensor to detect a water level of the water in the water container.

7. The refrigerator of claim 6, wherein
the controller is configured to, in the first mode, and according to the water level detected by the water level sensor, control the control valve so that water is supplied to the water container until the detected water level in the water container reaches a preset water level.

8. The refrigerator of claim 4,
wherein the water container includes:
a water container body to store water, and
a water container cover coupled to an upper portion of the water container body, and including:
an opening/closing portion configured to open and close an inlet through which water flows into the water container body.

9. The refrigerator of claim 8, wherein
while the water container is positioned in the water container mounting space in a state in which the opening/closing portion is open, the water supply unit is pressed upward by the opening/closing portion.

10. The refrigerator of claim 4, further comprising:
a seating recess configured to support a bottom surface of the water container while the water container is positioned in the water container mounting space.

11. The refrigerator of claim 10, further comprising:
an anti-slip member on the seating recess and configured to prevent the water container supported on the seating recess from slipping on the seating recess.

12. The refrigerator of claim 1, further comprising:
a water container sensor configured to:
detect upward movement of the water supplier, and
transmit a signal indicating the detected upward movement of the water supplier to the controller.

13. The refrigerator of claim 12, wherein the water container sensor includes at least one of a magnetic sensor, an infrared sensor, or a capacitive sensor.

14. The refrigerator of claim 1, further comprising:

an operation lever sensor configured to:

detect manual operation of the operation lever, and transmit a signal indicating the detected manual operation of the operation lever to the controller.

15. The refrigerator of claim 14, wherein the operation lever sensor includes at least one of a pressure sensor, a capacitive sensor, an infrared sensor, an optical fiber sensor, or a magnetic sensor.

16. A refrigerator, comprising:

a storage space;

a door to open and close the storage space;

a water supply device in the door to provide a supply of water, and including:

a control valve configured to control the supply of water by the water supply device, a water supplier configured to be movable up and down, the water supplier having a lower surface configured to contact an upper surface of a water container such that an external upward force by the water container moves the water supplier from a lower position to an upper position, and an operation lever extending downward from the water supplier, and that is manually operable; and a controller configured to:

in response to the water supplier being pressed upward by the water container under the water supplier without the operation lever being manually operated, control the control valve in a first mode to supply water to the water container under the water supplier and pressing the water supplier upward, and in response to the operation lever being manually operated while the water supplier is not pressed upward by a water container under the water supplier, control the control valve in a second mode differently than in the first mode to supply water to the water container under the water supplier and not pressing the water supplier upward.

17. The refrigerator of claim 16, wherein the controller is configured to control the control valve so that, in the first mode, a predetermined amount of water is supplied to the water container under the water supplier and pressing the water supplier upward.

18. The refrigerator of claim 16, wherein the controller is configured to control the control valve so that, in the second mode, water is supplied to the water container under the water supplier and not pressing the water supplier upward only while the operation lever is manually operated.

19. The refrigerator of claim 16, further comprising:

a water container mounting space below the water supply device, wherein the water container mounting space is configured so that a water container is removably positionable in the water container mounting space to receive water supplied by the water supply device.

20. The refrigerator of claim 19, further comprising:

the water container, wherein the water container is configured to press the water supplier upward when the water container is positioned in the water container mounting space.

* * * * *